N. BARRY.
SAFETY SET COLLAR.
APPLICATION FILED FEB. 21, 1916.

1,264,594. Patented Apr. 30, 1918.

Witnesses
Philip E. Barnes
Wm. H. Gross

Inventor
Nicholas Barry
By Alexander J. Powell
Attorneys

UNITED STATES PATENT OFFICE.

NICHOLAS BARRY, OF MUSCATINE, IOWA.

SAFETY SET-COLLAR.

1,264,594. Specification of Letters Patent. Patented Apr. 30, 1918.

Application filed February 21, 1916. Serial No. 79,781.

*To all whom it may concern:*

Be it known that I, NICHOLAS BARRY, a citizen of the United States, residing at Muscatine, in the county of Muscatine and State of Iowa, have invented certain new and useful Improvements in Safety Set-Collars; and I hereby declare that the following is a full, clear, and exact description thereof, reference being had to the accompanying drawings, which form part of this specification.

This invention is an improvement in adjustable set collars for use on shafting; and its object is to provide a novel hollow set collar made of one piece of pressed steel and so formed that there will be no liability of any one being caught by any projecting parts of the collar or its fastenings; and which collar can be made more cheaply than other forms of set collars.

The invention consists in the novel set collar and its fastening means as illustrated in the accompanying drawings, in which, Figure 1 is a front view of the set collar as applied to a shaft.

Figure 1:
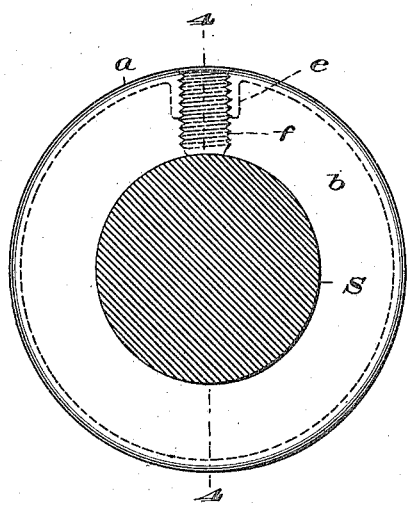
Figure 2:
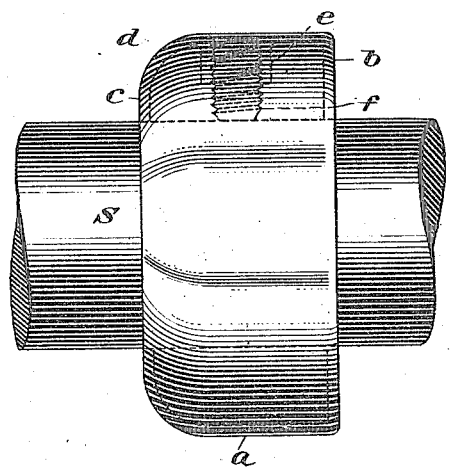
Fig. 2 is a side view of Fig. 1.
Figure 3:
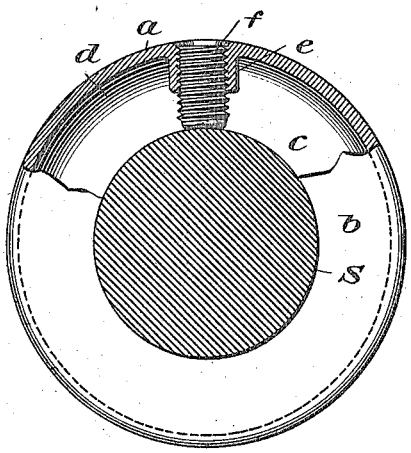
Fig. 3 is a view similar to Fig. 1 partly in section.

The set collar is made in one piece, of sheet steel, or other suitable sheet metal, pressed into shape. Said collar comprises a cylindrical body *a* approximately U-shaped in cross section and having at one end an inwardly projecting flange, or annular disk portion *b*, having an axial opening adapted to fit neatly upon the shaft S to which the collar is to be applied, as indicated in the drawings; the flange *b* standing perpendicular to the shaft.

Figure 4:
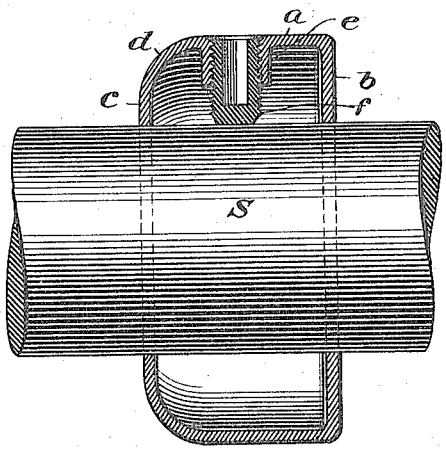
Fig. 4 is a sectional view on line 4—4, Fig. 1.

The other end of the body is bent inwardly as at *d* and merges into a flange or annular disk portion *c* having an axial opening to fit the shaft S, as shown. The outer part of flange *c* merges into the part *d* and said part *d* forming a rounded shoulder on the rear or outer end of the collar. The axial openings in the flanges *b*, *c* are truly bored so that the collar will fit properly upon the shaft S, said collar being supported on the shaft and engaging therewith only by the narrow edges of the openings in the flanges *b* and *c* as shown in Fig. 4.

The body *a* of the collar is also formed with an integral inwardly projecting annular boss *e* formed out of the material of the body and at about the center of the width thereof by pressing inwardly a part of the body portion *a* thereof; and said boss *e* is shorter than the depth of both flanges *b* and *c*, and its outer end merges directly into the body *a*. Said boss is internally threaded, as shown, for engagement of a set-screw *f*, which may be made either slotted or hollow for engagement by a suitable wrench or driver; and said screw is of such length that when it is turned into engagement with the shaft S, to fasten the collar thereon, the outer end of the screw lies within the exterior circumferential plane of the body *a* of the collar and does not project beyond the same; thus leaving the exterior of the collar, when applied to a shaft, smooth and wholly free from any projections which might catch the hands, garments or hair of a person.

The collar is slipped endwise on the shaft until the end *b* abuts closely against the object to be held upon the shaft; then the screw *f* is turned inward until it binds the collar securely in position on the shaft. The resiliency of the portion *a* of the collar will enable the screw *f* to be forced very tightly into place and at the same time the resiliency of the metal will hold the screw tightly in the collar, and thus insure the retention of the collar in proper position upon the shaft.

The collars are preferably galvanized or tinned to prevent rust. They are simple, economical to manufacture, and efficient in use; and as the fastening screw does not project beyond the outer surface of the collar when applied to a shaft it is a perfect safety collar.

What I claim is:

1. A resilient pressed sheet metal safety set collar U-shaped in cross section comprising a cylindric body having at each end an integral flange, each flange extending inward and having its inner edge adapted to fit around the shaft on which the collar is mounted; said body also having an inwardly projecting integral radial boss having a threaded bore of uniform diameter, the outer end of said boss merging directly into the metal of the body at the periphery thereof, said boss being shorter than the depth of said flanges; and a headless screw engaged with said boss, the outer end of said screw lying within the outer periphery of the body when the screw is engaged with the shaft; the collar being retained by the direct engagement of the inner edges of said flanges with the shaft when the screw is set home, substantially as described.

2. A resilient safety set collar pressed out of sheet metal and U-shaped in cross section; said collar comprising a cylindric body having at each end an integral flange extending inward and its inner edge adapted to fit the shaft on which the collar is mounted; said body also having an inwardly projecting resilient integral radial boss having a threaded bore of uniform diameter; the outer end of said boss merging directly into the outer peripheral metal of the body; and a headless screw engaged with said boss and having its outer end recessed for engagement with a setting tool, the outer end of said screw lying within the outer periphery of the body when the screw is engaged with the shaft; the collar being retained by the direct engagement of the inner edges of said flanges with the shaft when the screw is set home, substantially as described.

In testimony that I claim the foregoing as my own, I affix my signature.

NICHOLAS BARRY.

Copies of this patent may be obtained for five cents each, by addressing the "Commissioner of Patents, Washington, D. C."